No. 668,558.　　　　　　　　　　　　　　　Patented Feb. 19, 1901.
F. FOUCHÉ.
APPARATUS FOR EFFECTING EXCHANGE OF TEMPERATURE.
(Application filed Apr. 13, 1899.)
(No Model.)

7 Sheets—Sheet 1.

Witnesses:
Dennis Sumby,
Geo. W. Rea.

Inventor
Frederick Fouché
By James L. Norris.
Atty.

No. 668,558. Patented Feb. 19, 1901.
F. FOUCHÉ.
APPARATUS FOR EFFECTING EXCHANGE OF TEMPERATURE.
(Application filed Apr. 13, 1899.)
(No Model.) 7 Sheets—Sheet 4.

No. 668,558. Patented Feb. 19, 1901.
F. FOUCHÉ.
APPARATUS FOR EFFECTING EXCHANGE OF TEMPERATURE.
(Application filed Apr. 13, 1899.)
(No Model.) 7 Sheets—Sheet 6.

No. 668,558. Patented Feb. 19, 1901.
F. FOUCHÉ.
APPARATUS FOR EFFECTING EXCHANGE OF TEMPERATURE.
(Application filed Apr. 13, 1899.)
(No Model.) 7 Sheets—Sheet 7.

Witnesses:
Dennis Dumby
Jno. N. Rea

Inventor
Frederick Fouché
By James L. Norris
Atty.

UNITED STATES PATENT OFFICE.

FREDERIC FOUCHÉ, OF PARIS, FRANCE.

APPARATUS FOR EFFECTING EXCHANGE OF TEMPERATURE.

SPECIFICATION forming part of Letters Patent No. 668,558, dated February 19, 1901.

Application filed April 13, 1899. Serial No. 712,948. (No model.)

*To all whom it may concern:*

Be it known that I, FREDERIC FOUCHÉ, a citizen of France, residing at Paris, France, have invented certain new and useful Improvements in Apparatus for Effecting Exchange of Temperature, of which the following is a specification.

The object of this invention is to provide an efficient apparatus for effecting exchange of temperature between fluids, the said apparatus mainly consisting of a number of double plates with spaces between them and hereinafter termed "elements," which elements are connected to form a complete apparatus.

I will describe my invention with reference to the accompanying drawings, in which—

Figure 1:
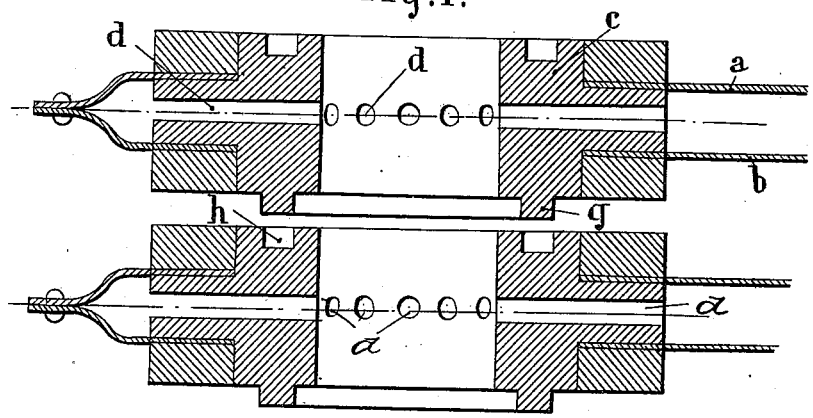
Figure 4:
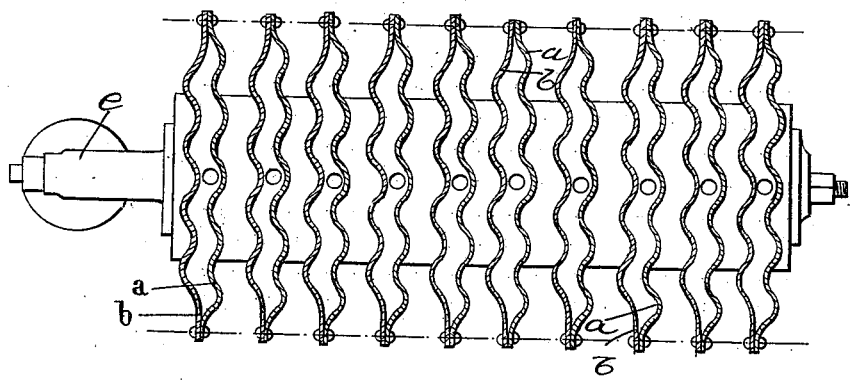
Figure 2:
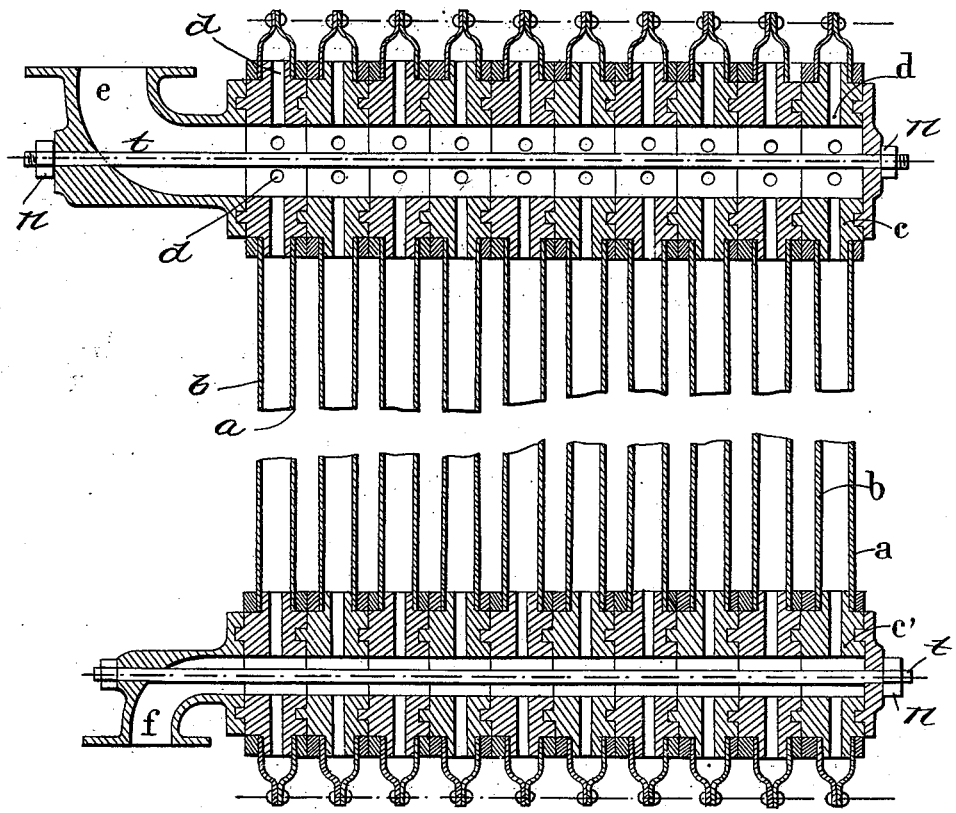
Figure 3:
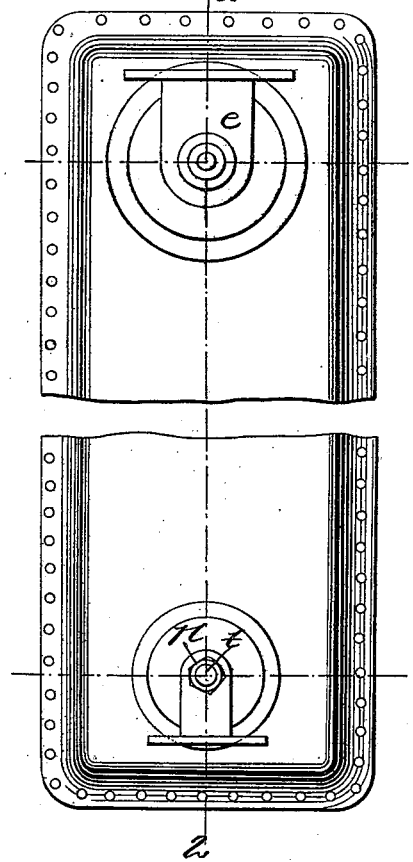
Figure 5:
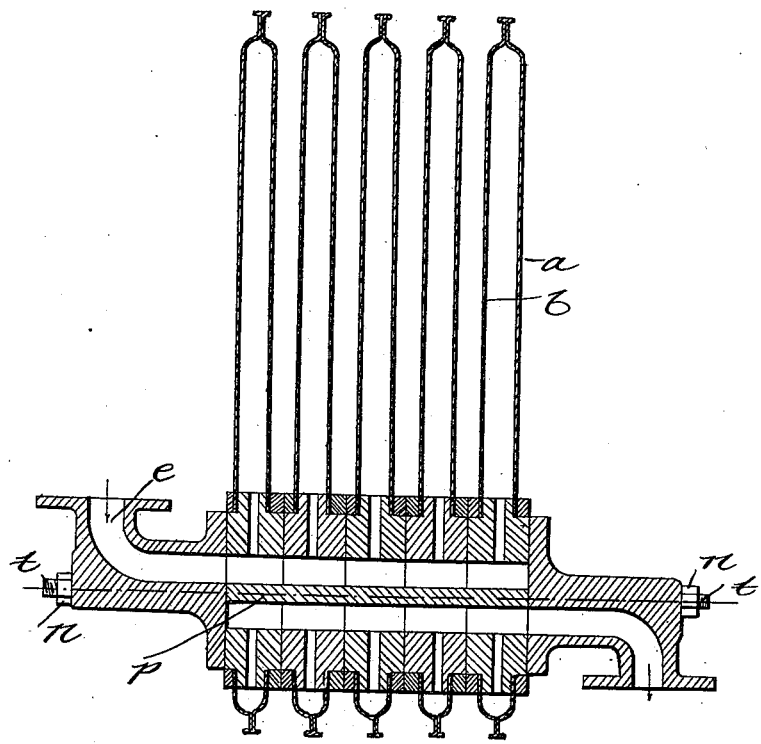
Figure 6:
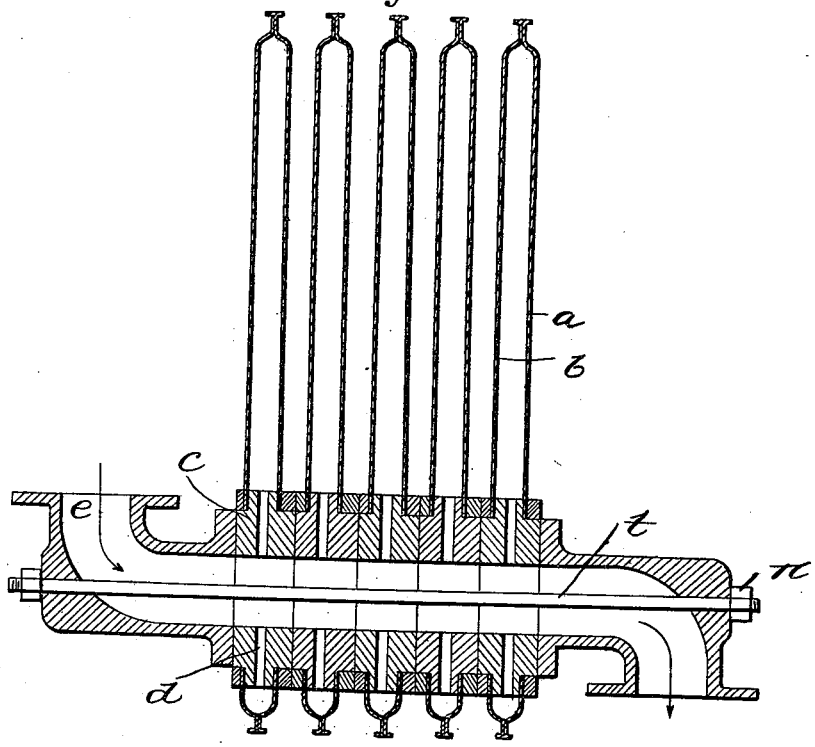
Figure 7:
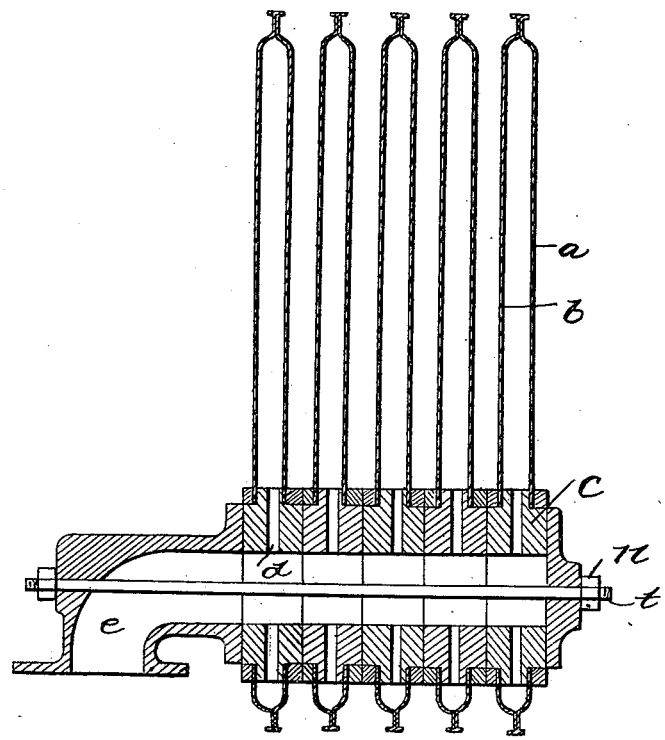
Figure 8:
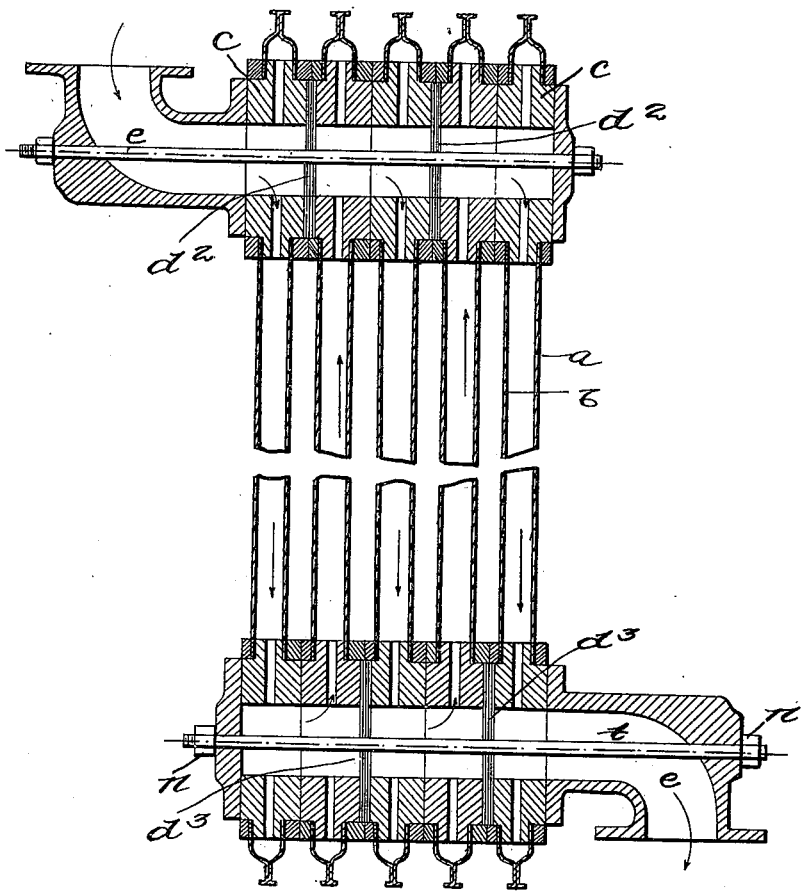

Figure 1 is a sectional view, the section being taken in the axial line of the cores, said figure being upon a scale slightly enlarged as compared with other figures, showing a portion of two elements with their cores separated from each other to show the manner of uniting the same. Fig. 2 is a longitudinal vertical section illustrating a complete apparatus, the section being taken upon the line 2 2 in Fig. 3. Fig. 3 is an end elevation of the apparatus shown in Fig. 2, the middle portion in both figures being broken away. Fig. 4 is a horizontal section taken upon a line between the upper and lower cores to show a modified construction. Fig. 5 is a vertical section taken centrally and longitudinally through a single core, showing a further modification. Figs. 6, 7, and 8 are similar sections showing other changes of construction.

Referring to the drawings, the elements are constructed as follows: Two metal plates $a$ $b$, stamped to a slightly-curved shape at the edges, while the remainder of their surfaces is left plane, are so joined together at their outer perimeters that there is a space between them. The juncture may be effected by means of rivets, hooks, or bolts or by soldering, welding, or brazing or other suitable means which will make fluid-tight joints. The plates are preferably of an elongated rectangular shape, as shown in Fig. 3. At the upper and lower ends of each plate are apertures, and between the two plates of each element there are interposed cores $c$ of a thickness sufficient to extend between the said plates and are provided with a shoulder extending outwardly on each side and which is engaged by the plates. The latter are clamped to the cores $c$ by means of the binding-rings $c^2$, which are of such size that when in position they fit neatly upon the shoulder or the core, and the rings, plates, and the cores are joined together by any convenient means that will insure perfectly fluid-tight joints. Through the said cores $c$ there extends a wide axial passage, into which open channels or ports $d$, parallel with the plates and radiating from the axial passage. The arrangement of core-pieces is the same or similar at the upper and lower parts of the elements, where there are to be separate channels for inlet and outlet, one above and one below.

By placing a number of elements thus constructed side by side, as shown in Fig. 2, so that the cores exactly correspond and fit together, a structure is formed consisting of hollow laminæ, the interior spaces of which are connected to two tubes $e f$ by the channels $d$, one of which is formed by the upper and lower series of core-pieces $c$ and the other by the lower core-piece $c'$, respectively. The several elements are bound together by bolts or rods $t$, passed through the said channels and to outside, where they are furnished with tightening-nuts $n$.

In order to insure fluid-tight joints, a plastic or packing material may be used thereat. The junction of one core with the next is shown as being made by means of a head or rib $g$ (the "male" part) on one side and a corresponding groove $h$ on the other side, wherein plastic or packing material may be introduced. A temperature-exchanging apparatus is thus obtained consisting of thin laminæ offering large areas and applicable to a great variety of purposes.

Fig. 4 shows an arrangement wherein the plates $a$ and $b$ are undulated, but have plane portions, which serve for joining the plates together. Elements thus constructed are stronger and more effective, inasmuch as the projecting or raised parts of their surfaces effect a secondary or stirring motion in the fluids passing between the plates.

In the arrangement shown in Fig. 5 one series of cores only is employed, the inner channel of which is divided into two parts by a partition P, the fluid entering the apparatus through one half of the channel and passing out through the other, together with the products of condensation, if any.

A single series of cores without any partition may be used, as shown in Figs. 6 and 7, the fluid being admitted at one end of the channel formed by such series of cores and discharged at the opposite end of the said channel, Fig. 6, or the fluid may be both admitted to and discharged from the same end of the channel, Fig. 7. These last-described arrangements are chiefly applicable where the fluid which passes into the apparatus is a vapor which will condense within the apparatus.

In some cases it may be expedient to arrange the elements in such a manner that the fluid-current shall traverse each element separately, or the elements may be divided into a number of groups or sets, through each of which is sent the whole of the fluid-current. To effect this it is only necessary to close the passage leading directly from one element to the next, Fig. 8, alternately above and below, so as to form a circuitous path for the fluid. The construction by which this is accomplished is shown in Fig. 8 and consists simply of partitions or baffle-plates $d^2$ in the channels formed by the upper cores, arranged to alternate with similar baffle-plates $d^3$ in the channel formed by the lower cores. The path of the fluid is shown by the arrows in said figure.

I do not limit myself to the precise details of construction described, as they may of course be varied without departing from the nature of the invention.

Having now particularly described and ascertained the nature of this invention and in what manner the same is to be performed, I declare that what I claim is—

1. A radiator comprising a series of plates connected together in pairs forming chambers and provided with suitable openings near the upper and lower end thereof, a hollow core mounted in each of said openings and engaging the inner face of each pair of said plates, each of said cores being provided on one face with a circumferential groove and upon its opposite face with a circumferential rib, the rib of one core engaging the groove of the adjacent core, said cores being further provided with a series of radially-extending channels communicating with said chambers, means engaging the outer face of the said plates for securing the latter to the core and means extending through said cores for securing the same together, substantially as described.

2. A radiator comprising a series of plates secured together in pairs forming chambers and provided with suitable openings near the upper and lower end thereof, a series of hollow cores extending through said openings and engaging the inner face of each of said plates, means engaging the outer face of said plates securing the latter to the cores, said cores being each provided with a series of radially-extending channels communicating with said chambers, and means extending through said cores for securing the same together.

3. A radiator comprising a series of plates secured together in pairs forming chambers and provided with suitable openings near the upper and lower end thereof, a hollow core mounted in each of said openings and engaging the inner face of each pair of plates, said core being provided with a circumferential groove and rib, the rib of one core engaging the groove of the adjacent core for interlocking the section, said cores being further provided with a series of radially-extending channels communicating with said chambers, a suitable inlet and outlet tube for said cores, binding-rings mounted upon the said cores for clamping the plates thereto and means extending through said cores and tubes for securing the same together, substantially as described.

In testimony whereof I have hereunto set my hand in presence of two subscribing witnesses.

FREDERIC FOUCHÉ.

Witnesses:
EDWARD P. MACLEAN,
ALFRED FREY.